(12) United States Patent
Mizusawa

(10) Patent No.: US 8,040,596 B2
(45) Date of Patent: Oct. 18, 2011

(54) EPI-ILLUMINATION OPTICAL SYSTEM FOR MICROSCOPES

(75) Inventor: Masayuki Mizusawa, Tokyo (JP)

(73) Assignee: Olympus Corporation, Tokyo (JP)

( * ) Notice: Subject to any disclaimer, the term of this patent is extended or adjusted under 35 U.S.C. 154(b) by 227 days.

(21) Appl. No.: 11/762,287

(22) Filed: Jun. 13, 2007

(65) Prior Publication Data

US 2008/0252965 A1 Oct. 16, 2008

(30) Foreign Application Priority Data

Jun. 13, 2006 (JP) ................................. 2006-163088

(51) Int. Cl.
*G02B 21/00* (2006.01)

(52) U.S. Cl. ........................................ 359/379; 359/385

(58) Field of Classification Search .................. 359/385, 359/379
See application file for complete search history.

(56) References Cited

U.S. PATENT DOCUMENTS

| | | | |
|---|---|---|---|
| 5,729,385 A * | 3/1998 | Nishida et al. ................ | 359/434 |
| 5,777,784 A | 7/1998 | Tanaka | |
| 6,507,434 B2 * | 1/2003 | Miyashita ..................... | 359/387 |
| 2003/0227674 A1 * | 12/2003 | Nihoshi et al. ................ | 359/386 |
| 2006/0114554 A1 * | 6/2006 | Suzuki et al. ................. | 359/380 |

FOREIGN PATENT DOCUMENTS

| | | |
|---|---|---|
| JP | 6-289301 | 10/1994 |
| JP | 2005-283879 | 10/2005 |

* cited by examiner

*Primary Examiner* — Joshua L Pritchett
(74) *Attorney, Agent, or Firm* — Pillsbury Winthrop Shaw Pittman, LLP

(57) ABSTRACT

The invention relates to an epi-illumination optical system for microscopes which relies upon a Köhler illumination system using a collective lens array, having simplified adjustment function capable of adjusting the image position of a light source to the back focal position of each microscope objective lens in operable association with microscope objective lens replacement. The invention provides an epi-illumination optical system for microscopes, with an objective lens serving as a condenser lens, which comprises a light source, a collimate lens, and a lens array. The epi-illumination optical system further comprises a projection optical system adapted to project an image of light source formed by collective lens array. The projection optical system comprises a partial optical system movable in an optical axis direction, so that the imaging position for the image array of light source is adjustable to the back focal position of the objective lens.

5 Claims, 4 Drawing Sheets

EPI-ILLUMINATION OPTICAL SYSTEM FOR MICROSCOPES

This application claims benefit of Japanese Application No. 2006-163088 filed in Japan on Jun. 13, 2006, the contents of which are incorporated by this reference.

BACKGROUND OF THE INVENTION

The present invention relates generally to an epi-illumination optical system for microscopes, and more particularly to an epi-illumination optical system for microscopes which has an adjustment function for microscope objective lens replacement, etc.

For epi-illumination optical systems for optical microscopes, in Patent Publication 1 there is an optical system proposed, which is designed to reduce illumination fluctuations stemming from the distribution of light from a light source. Patent Publication 1 teaches that a lens array is used to form a light source image array, and form the image of that light source image array at the exit pupil position (back focal position) of an objective lens.

Patent Publication 1

JP (A)2005-283879

SUMMARY OF THE INVENTION

According to the invention, an epi-illumination optical system for microscopes, with an objective lens serving also as a condenser lens, characterized by comprising:

a light source, a collimate lens, a lens array adapted to form an intermediate image of said light source on an exit-side lens surface in the form of a light source image array, and a projection optical system adapted to project said light source image array, wherein:

said projection optical system comprises a partial optical system movable in an optical axis direction, and by said partial optical system, the position of projection of said light source image array is adjusted to align the position of projection of said light source image array with the back focal position of the objective lens.

Preferably in this invention, the aforesaid partial optical system has positive refracting power that converts divergent light into convergent light wherein the angle of divergence of said divergent light is greater than the angle of convergence of said convergent light.

It is also preferable that the aforesaid partial optical system comprises a lens positioned nearest to said objective lens side.

The aforesaid collective lens array or said partial optical system having a reduced magnification in said projection optical system, too, may be movable and adjustable in a direction along the optical axis.

Still other objects and advantages of the invention will in part be obvious and will in part be apparent from the specification.

The invention accordingly comprises the features of construction, combinations of elements, and arrangement of parts which will be exemplified I the construction hereinafter set forth, and the scope of the invention will be indicated in the claims.

DESCRIPTION OF THE PREFERRED EMBODIMENTS

The epi-illumination optical system for microscopes of the invention is now explained with reference to some examples. In the following description, the epi-illumination optical system for microscopes will be called simply the epi-illumination optical system.

Figure 1:
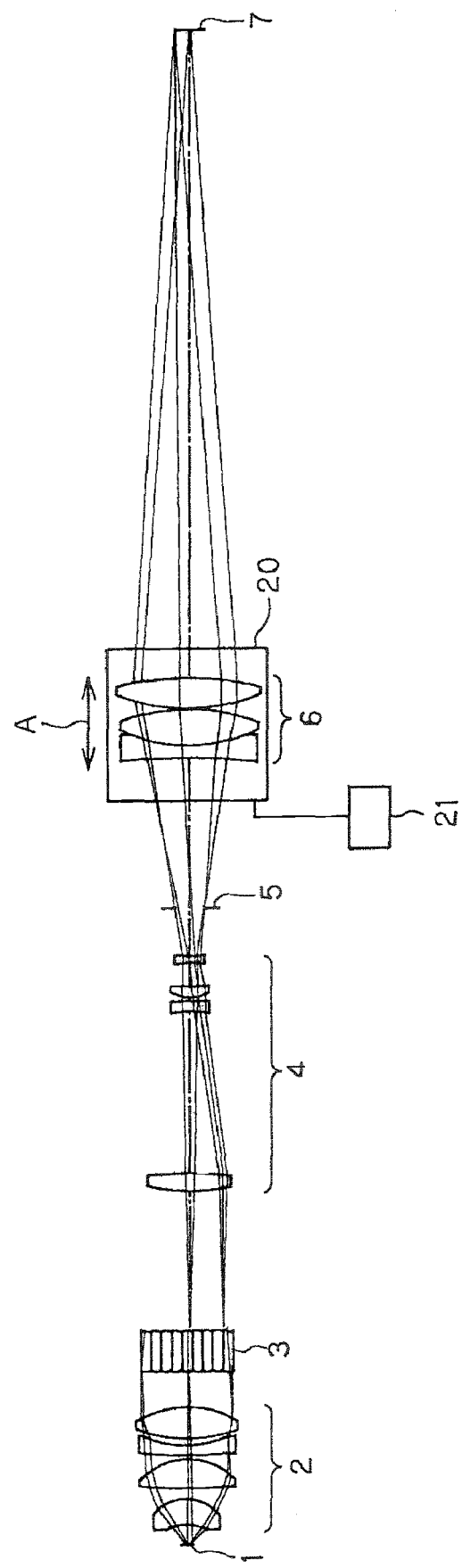
FIG. 1 is a taken-apart optical path diagram illustrative of the epi-illumination optical system for microscopes according to one example of the invention.

FIG. 1 is a taken-apart optical path diagram illustrative of the epi-illumination optical system for microscopes according to one example of the invention. The epi-illumination optical system here further comprises a microscope objective lens that serves also as a condenser lens, although that objective lens is left out.

The epi-illumination optical system of the invention is a Köhler illumination system using a collective lens array that is specifically built up of a light source 1, a collimate lens 2, a lens array 3, an image position adjustment optical system 4 of negative power, a field stop 5 and a relay lens 6 of positive power. Note here that the projection optical system is constructed of the image position adjustment optical system 4 and the relay lens 6.

Divergent light from the light source 1 is collimated by the collimate lens 2. The collimated light enters the lens array 3 having an exit-side lens surface in alignment with the back focal position. Therefore, the collimated light incident on the lens array 3 is focused on the exit-side lens surface; that is, an intermediate image (the image of light source 1) is formed on the lens surface on the exit side. The intermediate image here is going to become an image (a light source image array) corresponding in sequence and number to the positive lenses (microlenses) involved. The image position adjustment optical system 4 forms a reduced virtual image of the intermediate image at a given position. Light diverging from that reduced virtual image is focused on an exit pupil position 7 via the field stop 5 and relay lens 6. Note here that the exit pupil position 7 is the back focal position of the microscope objective lens (not shown). At that exit pupil position 7 here, the reduced virtual image is formed as a magnified real image this time. However, it is noted that the projection optical system (image position adjustment optical system 4 and relay lens 6) is generally in the form of a reducing optical system. Therefore, the intermediate image is reduced and projected onto the exit pupil position 7 of the microscope objective lens.

And now, the exit pupil position 7 that is the back focal position of the microscope objective lens varies with the type (e.g., magnification) of the microscope objective lens. For this reason, upon replacement of one microscope objective lens with another, there is the exit pupil position 7 changing too. As there is a variation in the exit pupil position (back focal position) 7 of the microscope objective lens, however, it causes the position of projection of the intermediate image to be going to be out of alignment with the exit pupil position (back focal position) 7 of another objective lens after replacement, producing illumination fluctuations that may otherwise get rid of the feature of the Köhler illumination optical system. The same will be true, too, when an optical path splitting optical system for autofocusing or the like is inserted in the rear of the microscope objective lens.

In the example here, therefore, a part of the projection optical system is designed to be movable in the optical axis direction to adjust the position of projection of the intermediate image. It is thus possible to align the position of projection of the intermediate image with the exit pupil position (back focal position) 7 of the microscope objective lens even when there is a different microscope objective lens used for it, or there is an optical path splitting optical system for autofocusing or the like inserted in the rear of the microscope objective lens.

In the example here, the projection optical system is in the form of a reducing optical system, as described above. For this reason, even when the collective lens array 3 is moved and adjusted in the optical axis direction to move the position of the intermediate image, the distance of movement of the image at the position of projection by the projection optical system is going to be shorter than the distance of movement of the collective lens array 3. The reason is that an optical system has a longitudinal magnification equal to the square of a transverse magnification; in a reducing optical system with a transverse magnification of less than 1, its longitudinal magnification defined by the distance of its movement in the optical axis direction is supposed to become much less than its transverse magnification (<1) rapidly.

In the example here, therefore, a magnifying optical system rather the collective lens array 3 is designed to be movable. The "magnifying optical system" refers to an optical system which has positive refracting power that works converting divergent light into convergent light and in which the angle of divergence of that divergent light is greater than the angle of convergence of that convergent light. Given the magnifying optical system, it is possible to increase the distance of movement of the image at the position of projection, even with a limited movement of that magnifying optical system.

Specifically, the relay lens 6 of the projection optical system defines the magnifying optical system; the relay lens 6 is movable. The relay lens 6, because of being a part of the projection optical system, may be called a partial optical system. On the other hand, the image position adjustment optical system 4 is in the form of a reducing optical system that is here restrained from movement. With the thus arranged example here, it is possible to align the position of the intermediate image with the exit pupil position 7 even upon a change in the exit pupil position (back focal position) 7 of the microscope objective lens.

In the example of FIG. 1, the relay lens 6 is placed on a moving mechanism 20. In the example here, the moving mechanism is a stage. The moving mechanism 20 is movable in a direction at least along the optical axis. Reference numeral 21 is a controller adapted to control the moving mechanism 20. In the example here, the relay lens 6 is moved by the moving mechanism 20 in the optical axis direction, as indicated by an action arrow A, to make its position adjustable. Therefore, when there is replacement with another microscope objective lens or there is an optical path splitting optical system for autofocusing or the like inserted in the rear of the microscope objective lens, the position of the relay lens 6 in the optical axis direction may be adjusted to align the imaging position for the intermediate image with the exit pupil position (back focal position) 7 of the microscope objective lens.

Thus, as far as the movement of the relay lens 6 is concerned, its amount can be reduced. Accordingly, the moving mechanism is unlikely to grow bulky. Further, adjustment of the imaging position enables uniform Köhler illumination of reduced fluctuations, even when there is replacement with another microscope objective lens or there is an optical path splitting optical system for autofocusing or the like inserted.

Figure 2:
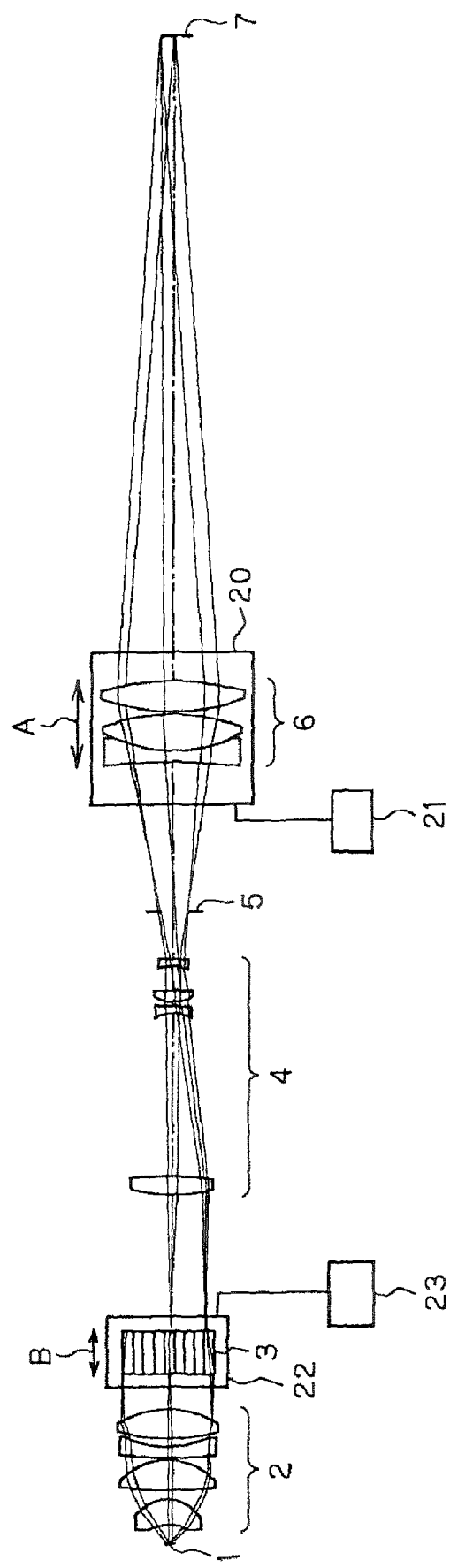
FIG. 2 is illustrative, as in FIG. 1, of one modification to the epi-illumination optical system for microscopes of FIG. 1.

FIG. 2 is illustrative of a modification to the epi-illumination optical system for microscopes of FIG. 1. A difference with FIG. 1 is that the lens array 3, too, is movable and adjustable in the optical axis direction, as indicated by an action arrow B in FIG. 2. To move the lens array 3, there are a moving mechanism 22 and a controller 23 provided. The controller 21 may serve also as the controller 23. Because the relay lens 6 is in the form of a magnifying optical system as described above, it is possible to change the imaging position for the intermediate image largely with a reduced or limited amount of movement. With the whole projection optical system in the form of a reducing optical system, on the other hand, there is no that large change in the imaging position for the intermediate image even when the lens array 3 is moved to some large degree. It is thus possible to implement adjustment of the imaging position for the intermediate image by movement and adjustment of the relay lens 6, and implement a tweak of the imaging position for the intermediate image by movement of the lens array 3. Thus, if both are used, it is then possible to easily yet precisely align the imaging position for the intermediate image with the exit pupil position 7 even when the exit pupil position (back focal position) 7 of the microscope objective lens varies over a wide range.

It is understood that the image position adjustment optical system in the projection optical system, too, is a reducing optical system. In other words, the aforesaid tweak may just as well be implemented by allowing the image position adjustment optical system 4 rather than the lens array 3 to be moved in the optical axis direction.

Figure 3:
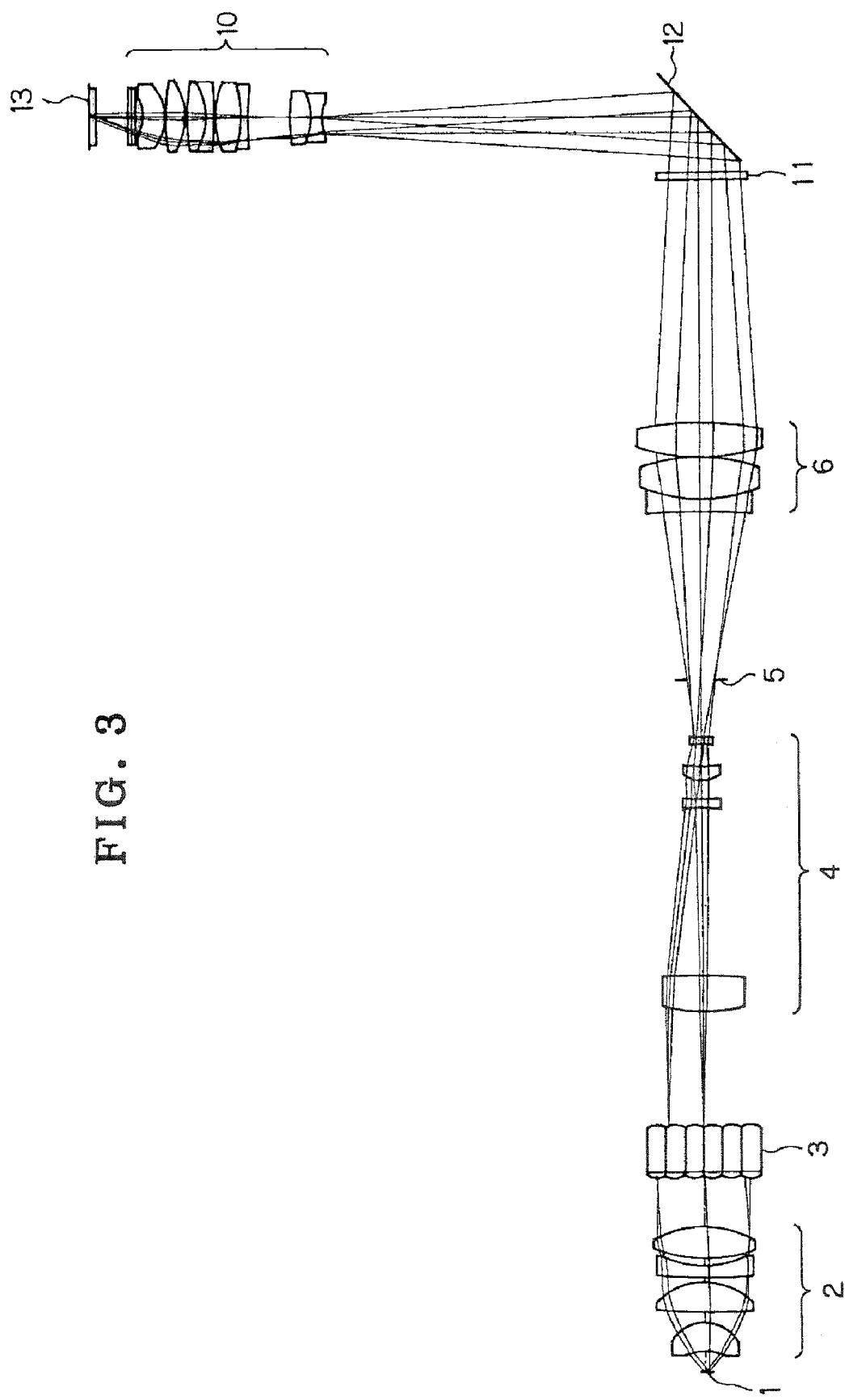
FIG. 3 is an optical path diagram of the epi-illumination optical system for microscopes according to one example of the invention, including a part of the optical system in the microscope.

FIG. 3 is an optical path diagram including a part of the optical path in the microscope. In FIG. 3, reference numeral 11 is a band-pass filter, 12 a dichroic mirror, 10 a microscope objective lens, and 13 a sample plane. By the collimate lens 2 and lens array 3, an intermediate image (the image of light source 1) is formed on an end face at the exit side. The intermediate image is a light source image in an array form (light source image array). Light from the intermediate image is converged at the relay lens 6. The converged light focuses on the exit pupil position 7 (FIGS. 1 and 2) via the band-pass filter 11 and dichroic mirror 12. The exit pupil position 7 is the back focal position of the microscope objective lens 10. The microscope objective lens 10 works also as a condenser lens. Therefore, light focusing on the exit pupil position 7 provides an illumination to the sample plane 13 via the microscope objective lens (condenser lens) 10. The sample plane 13 is located at the front focal position of the microscope objective lens 10. Therefore, the sample plane 13 is subjected to Köhler illumination.

The microscope objective lens 10 is an infinity correction system; light from the sample plane (sample) 13 is collimated at the microscope objective lens 10. The collimated light focuses at a given position by an imaging lens via an excited light cut filter, a reflecting mirror, etc. At the given position, an image of the sample plane (sample) is formed on a magnified scale. This image is magnified and viewed through an eyepiece lens or, alternatively, taken and measured through a taking optical system. In FIG. 3, the excited light cut filter, reflecting mirror and imaging lens are left out.

Figure 4:
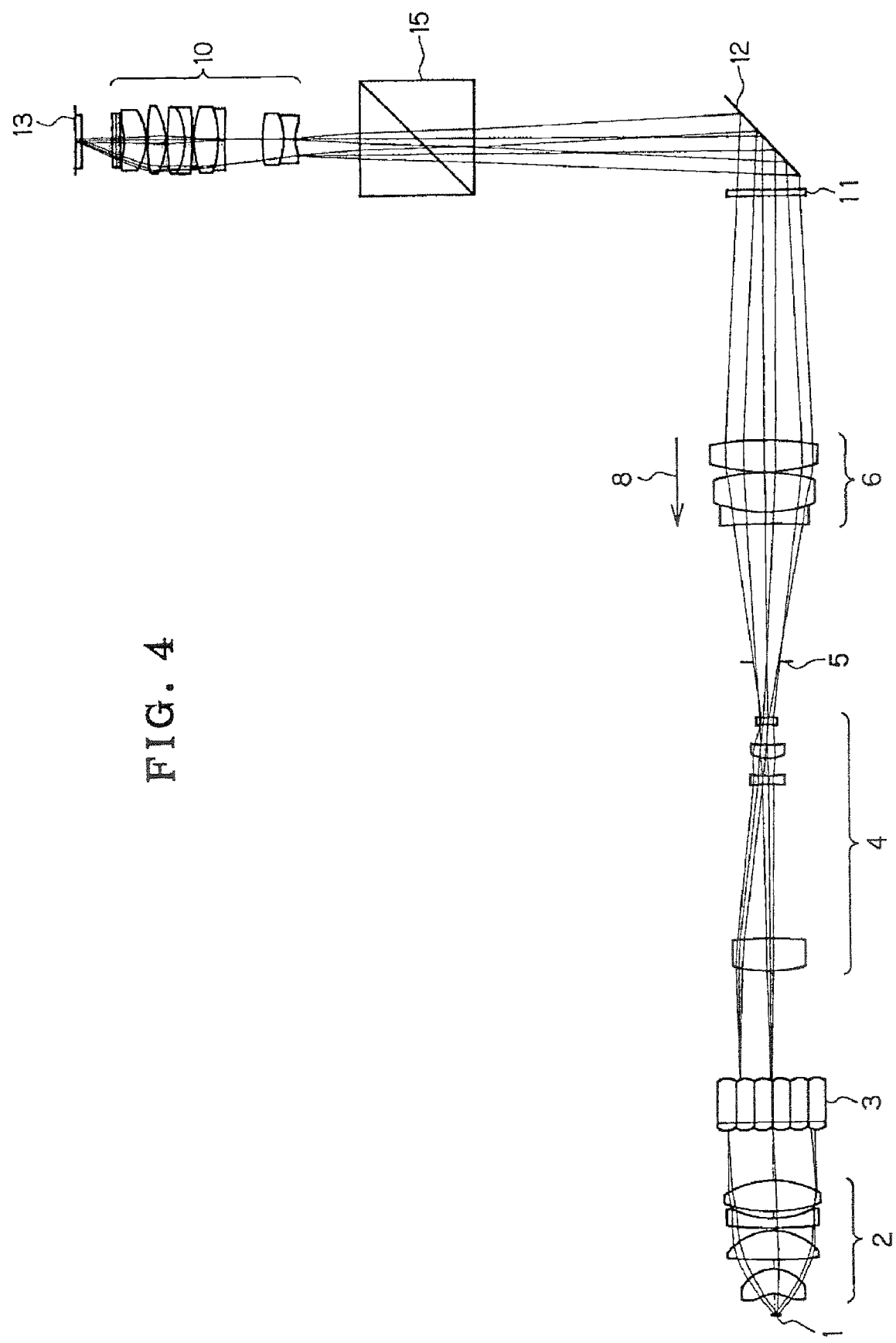
FIG. 4 is illustrative of how the movement of a relay lens is adjusted by an optical path splitting optical system for autofocusing inserted between the microscope objective lens and a dichroic mirror in the state of FIG. 3.

For possible autofocusing onto a sample on the sample plane 13, there is often a focus detection system provided. In that case, an optical path splitting optical system 15 is inserted in a slightly wide spacing between the microscope objective lens 10 and the dichroic mirror 12, as shown in FIG. 4. For instance, movement of the objective lens side causes the exit pupil position 7 (FIGS. 1 and 2) of the microscope objective lens 10 to move toward the side of the sample plane 13. As a result, the exit pupil position 7 comes out of alignment with the position of projection of the intermediate image. Accordingly, the relay lens 6 is moved in a direction indicated by an action arrow 8 in such a way as to approach the field stop 5. Thus, adjustment is implemented in such a way as to align the position of projection of the intermediate image with the thus moved exit pupil position 7. Accordingly, even when the optical path splitting optical system 15 is inserted, the exit pupil position 7 may be aligned with the position of projection of the intermediate image. It is thus possible to implement uniform illumination of reduced fluctuations.

While the epi-illumination optical system for microscopes according to the invention has been described with reference to some embodiments or examples, it is understood that the invention is by no means limited to them and so many modifications may be possible.

With the epi-illumination optical system for microscopes of the invention as described above, it is possible to cope with even when a plurality of objective lenses having varying exit pupil positions (back focal positions) are used, or there is an optical path splitting optical system or the like inserted, thereby making sure uniform Köhler illumination of reduced fluctuations.

I claim:

1. An epi-illumination optical system for microscopes, with an objective lens serving also as a condenser lens, comprising:
    a light source,
    a collimate lens,
    a lens array adapted to form an intermediate image of said light source on an exit-side lens surface in the form of a light source image array;
    a projection optical system adapted to project said light source image array on a back focal position of the objective lens; and
    a stop,
    wherein said projection optical system comprises a relay lens movable along substantially an entire range between a pupil position and the stop, exclusive of the pupil position and the stop, such that the relay lens is not moveable to the pupil position or the stop position, in an optical axis direction, and by said relay lens, a position of projection of said light source image array is adjusted to align the position of projection of said light source image array with a back focal position of the objective lens.

2. The epi-illumination optical system for microscopes according to claim 1, characterized in that said relay lens has positive refracting power that converts divergent light into convergent light wherein an angle of divergence of said divergent light is greater than an angle of convergence of said convergent light.

3. The epi-illumination optical system for microscopes according to claim 1, characterized in that said relay lens comprises a lens positioned nearest to said objective lens side.

4. The epi-illumination optical system for microscopes according to claim 1, characterized in that said lens array or an image position adjustment optical system having a reduced magnification in said projection optical system, too, is movable and adjustable in a direction along an optical axis.

5. An epi-illumination optical system for a microscope comprising:
    a light source;
    a collimator lens;
    an arrayed lens adapted to form a light source image array on an exit-side lens surface thereof;
    a projection optical system adapted to project said light source image array on a back focal position of the objective lens;
    a stop; and
    a relay lens movable along an optical axis direction substantially an entire range between the stop and the back focal position of the objective lens, exclusive of the back focal position and the stop.

* * * * *